US010809881B2

(12) United States Patent
Kindelsberger et al.

(10) Patent No.: US 10,809,881 B2
(45) Date of Patent: Oct. 20, 2020

(54) VISUAL GRAPH CONSTRUCTION FROM RELATIONAL DATA

(71) Applicant: Oracle International Corporation, Redwood Shores, CA (US)

(72) Inventors: Julia Kindelsberger, Munich (DE); Daniel Langerenken, Foster City, CA (US); Korbinian Schmid, San Mateo, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/603,218

(22) Filed: May 23, 2017

(65) Prior Publication Data

US 2018/0136830 A1    May 17, 2018

Related U.S. Application Data

(60) Provisional application No. 62/421,837, filed on Nov. 14, 2016.

(51) Int. Cl.
*G06F 3/0482* (2013.01)
*G06F 16/00* (2019.01)
(Continued)

(52) U.S. Cl.
CPC ........ *G06F 3/0482* (2013.01); *G06F 3/04847* (2013.01); *G06F 16/00* (2019.01);
(Continued)

(58) Field of Classification Search
CPC .. G06F 3/0482; G06F 16/9024; G06F 3/0486; G06F 17/3056; G06F 17/30595; G06F 17/30; G06F 17/30958; G06F 8/34; G06F 3/04847; G06F 16/00; G06T 2200/24; G06T 11/206; Y10S 707/954
See application file for complete search history.

(56) References Cited

U.S. PATENT DOCUMENTS 4,613,946 A    9/1986  Forman
5,515,487 A    5/1996  Beaudet
(Continued)

OTHER PUBLICATIONS

Djdates, Access 2007 Tutorial, Nov. 15, 2009, Youtube.com, link: https://www.youtube.com/watch?v=nszRT3nRUMU.*
(Continued)

*Primary Examiner* — Nhat Huy T Nguyen
(74) *Attorney, Agent, or Firm* — Hickman Palermo Becker Bingham LLP

(57) ABSTRACT

Techniques herein visually construct and summarize property graphs. In an embodiment, a computer loads raw data tables and generates vertices and edges based on the data tables. Vertices may be disconnected or may be interconnected by edges based on foreign keys. In an embodiment, a junction vertex can be converted into a special edge that interconnects two other vertices. In an embodiment, a junction vertex can be converted into a self-directed edge that interconnects data within a single vertex. Filtration can be applied when loading raw tables and then adjusted after visual construction of vertices and edges.

22 Claims, 9 Drawing Sheets

(51) Int. Cl.
*G06F 16/901* (2019.01)
*G06T 11/20* (2006.01)
*G06F 3/0484* (2013.01)
*G06F 3/0486* (2013.01)

(52) U.S. Cl.
CPC ........ *G06F 16/9024* (2019.01); *G06T 11/206* (2013.01); *G06F 3/0486* (2013.01); *G06T 2200/24* (2013.01)

(56) References Cited

U.S. PATENT DOCUMENTS

| | | | |
|---|---|---|---|
| 5,553,218 A * | 9/1996 | Li | G06F 16/284 |
| 5,822,592 A | 10/1998 | Zhu | |
| 6,400,383 B1 | 6/2002 | Geisler | |
| 6,486,896 B1 | 11/2002 | Ubillos | |
| 6,774,899 B1 | 8/2004 | Ryall | |
| 7,523,401 B1 * | 4/2009 | Aldridge | G06F 16/958 |
| | | | 715/760 |
| 7,624,081 B2 | 11/2009 | Zhao et al. | |
| 8,499,284 B2 | 7/2013 | Pich | |
| 8,527,909 B1 | 9/2013 | Mullany | |
| 8,713,063 B2 | 4/2014 | Abrams | |
| 8,810,576 B2 | 8/2014 | Duplessis | |
| 8,910,084 B2 | 12/2014 | Helfman | |
| 8,937,618 B2 | 1/2015 | Erez | |
| 8,990,675 B2 * | 3/2015 | Folting | G06Q 10/10 |
| | | | 715/212 |
| 8,996,492 B2 | 3/2015 | Paradies et al. | |
| 9,092,744 B2 | 7/2015 | Tito | |
| 9,195,941 B2 | 11/2015 | Mojsilovic et al. | |
| 9,262,537 B2 | 2/2016 | Kim | |
| 9,466,138 B2 | 10/2016 | Singh | |
| 9,477,732 B2 | 10/2016 | Helfman | |
| 9,495,777 B2 | 11/2016 | Srivastava | |
| 9,508,167 B2 | 11/2016 | Kim | |
| 9,519,677 B2 | 12/2016 | Wong | |
| 9,600,603 B2 | 3/2017 | Weise | |
| 9,658,943 B2 | 5/2017 | Gounares | |
| 9,705,815 B2 | 7/2017 | Mattson | |
| 9,710,544 B1 | 7/2017 | Smith | |
| 9,734,040 B2 | 8/2017 | Gounares | |
| 9,740,368 B1 | 8/2017 | Love | |
| 9,836,183 B1 | 12/2017 | Love | |
| 9,836,508 B2 | 12/2017 | Morton | |
| 9,836,524 B2 | 12/2017 | Bayliss | |
| 9,864,672 B2 | 1/2018 | Seto | |
| 9,911,211 B1 | 3/2018 | Damaraju | |
| 9,996,236 B1 | 6/2018 | Spencer-Harper | |
| 10,268,735 B1 | 4/2019 | White | |
| 10,347,017 B2 | 7/2019 | Ruble | |
| 10,585,575 B2 | 3/2020 | Kindelsberger | |
| 10,599,656 B1 | 3/2020 | Sharma | |
| 10,672,155 B2 | 6/2020 | Contractor | |
| 2002/0161736 A1 | 10/2002 | Beygelzimer | |
| 2002/0161853 A1 | 10/2002 | Burak | |
| 2004/0015480 A1 | 1/2004 | Federighi | |
| 2005/0007383 A1 | 1/2005 | Potter | |
| 2006/0156246 A1 | 7/2006 | Williams | |
| 2007/0266039 A1 * | 11/2007 | Boykin | G06F 8/10 |
| 2008/0297753 A1 | 12/2008 | Wang | |
| 2010/0063785 A1 | 3/2010 | Pich | |
| 2010/0161680 A1 | 6/2010 | Atre | |
| 2010/0179844 A1 | 7/2010 | LaFergola | |
| 2011/0115814 A1 | 5/2011 | Heimendinger | |
| 2011/0148880 A1 | 6/2011 | De Peuter | |
| 2011/0249002 A1 | 10/2011 | Duplessis | |
| 2011/0267350 A1 | 11/2011 | Cubera | |
| 2011/0307685 A1 | 12/2011 | Song | |
| 2012/0005631 A1 | 1/2012 | B'Far | |
| 2013/0103719 A1 | 4/2013 | Gotz | |
| 2013/0187941 A1 | 7/2013 | Noon | |
| 2013/0212479 A1 | 8/2013 | Willis | |
| 2013/0222388 A1 | 8/2013 | McDonald | |
| 2013/0229416 A1 | 9/2013 | Krajec | |
| 2013/0238667 A1 | 9/2013 | Carvalho | |
| 2013/0250060 A1 | 9/2013 | Andersson | |
| 2013/0282889 A1 * | 10/2013 | Tito | H04L 43/00 |
| | | | 709/224 |
| 2014/0244623 A1 | 8/2014 | King | |
| 2014/0244667 A1 * | 8/2014 | Bararsani | G06F 17/30017 |
| | | | 707/751 |
| 2014/0320498 A1 | 10/2014 | Ajitomi | |
| 2014/0320500 A1 | 10/2014 | Fletcher | |
| 2014/0354650 A1 | 12/2014 | Singh | |
| 2014/0372458 A1 | 12/2014 | Jurca | |
| 2015/0026158 A1 | 1/2015 | Jin | |
| 2015/0089366 A1 | 3/2015 | Beckett | |
| 2015/0112750 A1 | 4/2015 | Grichnik | |
| 2015/0138203 A1 | 5/2015 | Nachmanson | |
| 2015/0254370 A1 | 9/2015 | Sexton | |
| 2015/0262396 A1 | 9/2015 | Devarajan | |
| 2015/0310644 A1 | 10/2015 | Zhou et al. | |
| 2015/0331932 A1 | 11/2015 | Georges | |
| 2015/0339835 A1 | 11/2015 | Mohr | |
| 2015/0347559 A1 | 12/2015 | Elias | |
| 2015/0370919 A1 | 12/2015 | Bornhoevd | |
| 2015/0378564 A1 | 12/2015 | Ramanathan | |
| 2016/0048787 A1 | 1/2016 | Shinkuma | |
| 2016/0035114 A1 | 2/2016 | Hesse | |
| 2016/0063037 A1 | 3/2016 | Savkli | |
| 2016/0071233 A1 | 3/2016 | Macko et al. | |
| 2016/0078344 A1 | 3/2016 | Agarwal et al. | |
| 2016/0103887 A1 | 4/2016 | Fletcher | |
| 2016/0103933 A1 | 4/2016 | Glover | |
| 2016/0110476 A1 | 4/2016 | Shinkuma | |
| 2016/0125093 A1 | 5/2016 | Cho | |
| 2016/0140152 A1 | 5/2016 | Sevenich et al. | |
| 2016/0140166 A1 | 5/2016 | Schechter | |
| 2016/0179887 A1 | 6/2016 | Lisonbee et al. | |
| 2016/0224532 A1 | 8/2016 | Miller | |
| 2016/0299991 A1 | 10/2016 | Hong et al. | |
| 2016/0304872 A1 | 10/2016 | Elowitz | |
| 2016/0342737 A1 | 11/2016 | Kaye | |
| 2016/0350389 A1 | 12/2016 | Kloke | |
| 2017/0004638 A1 | 1/2017 | Csenteri | |
| 2017/0042495 A1 | 2/2017 | Matsuzaki | |
| 2017/0085445 A1 | 3/2017 | Layman | |
| 2017/0109907 A1 | 4/2017 | Hamedani | |
| 2017/0140068 A1 | 5/2017 | Oh | |
| 2017/0154445 A1 | 6/2017 | Maruhashi | |
| 2017/0177681 A1 | 6/2017 | Potiagalov | |
| 2017/0177744 A1 | 6/2017 | Potiagalov | |
| 2017/0185655 A1 | 6/2017 | Jahankhani | |
| 2017/0195854 A1 | 7/2017 | Shi-Nash | |
| 2017/0200293 A1 | 7/2017 | Solem | |
| 2017/0221240 A1 | 8/2017 | Stetson | |
| 2017/0255945 A1 | 9/2017 | McCord | |
| 2017/0323463 A1 | 11/2017 | Leiba | |
| 2017/0330357 A1 | 11/2017 | Siegel | |
| 2017/0351406 A1 | 12/2017 | Rossi | |
| 2017/0357429 A1 | 12/2017 | Dixon | |
| 2017/0371879 A1 | 12/2017 | Jang | |
| 2018/0011746 A1 | 1/2018 | Stanfill | |
| 2018/0025035 A1 | 1/2018 | Xia | |
| 2018/0025093 A1 | 1/2018 | Xia | |
| 2018/0025361 A1 | 1/2018 | Ferrarons | |
| 2018/0068406 A1 | 3/2018 | Van De Sande | |
| 2018/0089237 A1 | 3/2018 | Dunne et al. | |
| 2018/0121414 A1 | 5/2018 | Nanavati | |
| 2018/0137667 A1 | 5/2018 | Kinelsberger | |
| 2018/0144424 A1 | 5/2018 | Sahu | |
| 2018/0144534 A1 | 5/2018 | Lee | |
| 2018/0157404 A1 | 6/2018 | Noel | |
| 2018/0157761 A1 | 6/2018 | Halstead | |
| 2018/0173372 A1 | 6/2018 | Greenspan | |
| 2018/0189416 A1 | 7/2018 | Lee | |
| 2018/0198819 A1 | 7/2018 | Lee | |
| 2018/0239959 A1 | 8/2018 | Bui | |
| 2018/0293330 A1 | 10/2018 | Kovac | |
| 2018/0315228 A1 | 11/2018 | Boettcher | |
| 2018/0349002 A1 | 12/2018 | Kindelsberger | |
| 2018/0352026 A1 | 12/2018 | Depner | |
| 2018/0357329 A1 | 12/2018 | Meyer | |

(56) References Cited

U.S. PATENT DOCUMENTS

| | | | |
|---|---|---|---|
| 2018/0367414 A1 | 12/2018 | Raghavendra |
| 2019/0325075 A1 | 10/2019 | Hilloulin |
| 2020/0004746 A1 | 1/2020 | Randall |
| 2020/0035002 A1 | 1/2020 | Epasto |
| 2020/0051293 A1 | 2/2020 | Hou |
| 2020/0134359 A1 | 4/2020 | Kim |

OTHER PUBLICATIONS

Kindelsberger, U.S. Appl. No. 15/469,674, filed Mar. 27, 2017, Office Action, dated Jul. 13, 2018.
TensorFlow, "TensorBoard: Graph Visualization", dated Nov. 2015, https://www.tensorflow.org/versions/r0.11/how_tos/graph_viz/, 10 pages.
Neo4j Data Import: Moving Data from RDBMS to Graph, Tutorial, https://neo4j.com/developer/guide-importing-data-and-etl/, dated Aug. 2016, 9 pages. Linkurious, A Web-Based Graph Data Visualization Tool for Investigative Journalism, http://www.influencemapping.org/blog/2015/09/30/linkurious.html, 3 pages. Dated Sep. 2015, 3 pages.
Kofia, et al., "Social Network: a Cytoscape app for visualizing co-publication networks [version 1; referees: 2 approved with reservations]", dated Aug. 5, 2015, 14 pages.
Graph Data, "Turi Machine Learning Platform User Guide", Working with Graphs, https://turi.com/learn/userguide/sgraph/sgraph.html, dated Jun. 2016, 1 page.
Gephi Tutorial Visualization, dated May 26, 2010, 24 pages.
Ganser et al., "Topological Fisheye Views for Visualizing Large Graphs", dated Jul. 2005, 8 pages.
Freeman, Eve, "Getting Sgtarted with Neo4j and Cypher", https://www.airpair.com/neo4j/posts/getting-started-with-neo4j-and-cypherdated Aug. 2016, 12 pages.
Ellson et al., "Graphviz and Dynagraph-Static and Dynamic Graph Drawing Tools", AT&T Labs—Research, dated 2004, 23 pages.
Tutorials, "Comparing Workflows", https://www.atlassian.com/git/tutorials/comparing-workflows, dated Apr. 28, 2014, 50 pages.
Koyalev, Sergey, "Visualizing Tensor How Grpahs with Tensor Board", Bog on All Things Cloud Foundry, https://blog.altoros.com/visualizing-tensorflow-graphs-with-tensorboard.html,dated Apr. 4, 2016, 5pgs.
Influence Mapping Group, "Linkurious, A Web-Based Graph Data Visualization Tool for Invenstigative Journalism", http://www.influencemapping.org/blog/2015/09/30/linkurious.htm, dated Sep. 30, 2015, 3pgs.
Hammant, Paul, "Whats Your Branching Model?", Blog, https://paulhammant.com/2013/12/04/what_is_your_branching_model/, dated Dec. 4, 2013, 4 pages.
Xirogiannopoulos et al., "Extracting and Analyzing Hidden Graphs from Relational Databases", ACM, SIGMOD dated 2017, 18 pages.
SQL Server Blog, "Graph Data Processing with SQL Server 2017 and Azure SQL Database", dated Aug. 20, 2017, 8 pages.
Oracle, "Using Property Graphs in an Oracle Database Environment", docs.oracle.com/database/122/SPGDG/using-property-graphs-oracle-database.htm#BDSPA191, Apr. 23, 2018, Apr. 23, 2018, 152 pages.
Kaur, Sawinder, "Visualizing Class Diagram Using OrientDB NoSQL Data-Store", dated Jul. 2016, 5 pages.
Mathew et al., "An Efficient Index based Query handling model for Neo4j", International Journal of Advances in Computer Science and Technology (IJACST), vol. 3 No. 2, dated 2014, 7 pages.
Dave et al., "GraphFrames: An Integrated API for Mixing Graph and Relational Queries", ACM, dated 2016, 8 pages.
Kindelsberger, U.S. Appl. No. 15/469,674, filed Mar. 27, 2017, Final Office Action, dated Jan. 18, 2019.
Kindelsberger, U.S. Appl. No. 15/609,629, filed May 31, 2017, Office Action, dated Jan. 2, 2019.
Kindelsberger, U.S. Appl. No. 15/469,674, filed Mar. 27, 2017, Office Action, dated Jun. 13, 2019.
Valiyev, Mahammad, "Graph Storage: How Good is CSR Really?", dated Dec. 10, 2017, 8 pages.
Kesheng Wu et al., "A Performance Comparison of Bitmap Indexes", proceedings of the 2001 ACM CIKM 10th International Conference on Information and Knowledge Management, dated Oct. 5, 2001, 2 pages.
Kindelsberger, U.S. Appl. No. 15/609,629, filed May 31, 2019, Notice of Allowance, dated Oct. 21, 2019.
Cruanes, U.S. Appl. No. 15/716,345, filed Sep. 26, 2017, Notice of Allowance, dated Nov. 21, 2019.
Anonymous, "Universally Unique Identifer", Wikipedia, dated Feb. 13, 2018, www.web/2018020325/https://en.wikipedia.org/wiki/Universally_unique_identifer, 10 pages.
Ahmed Elgohary et al., "Compressed Linear Algebra for Large-Scale Machine Learning", VLDB Journal, No. 27, No. 5, dated Sep. 12, 2017, pp. 719-744.

* cited by examiner

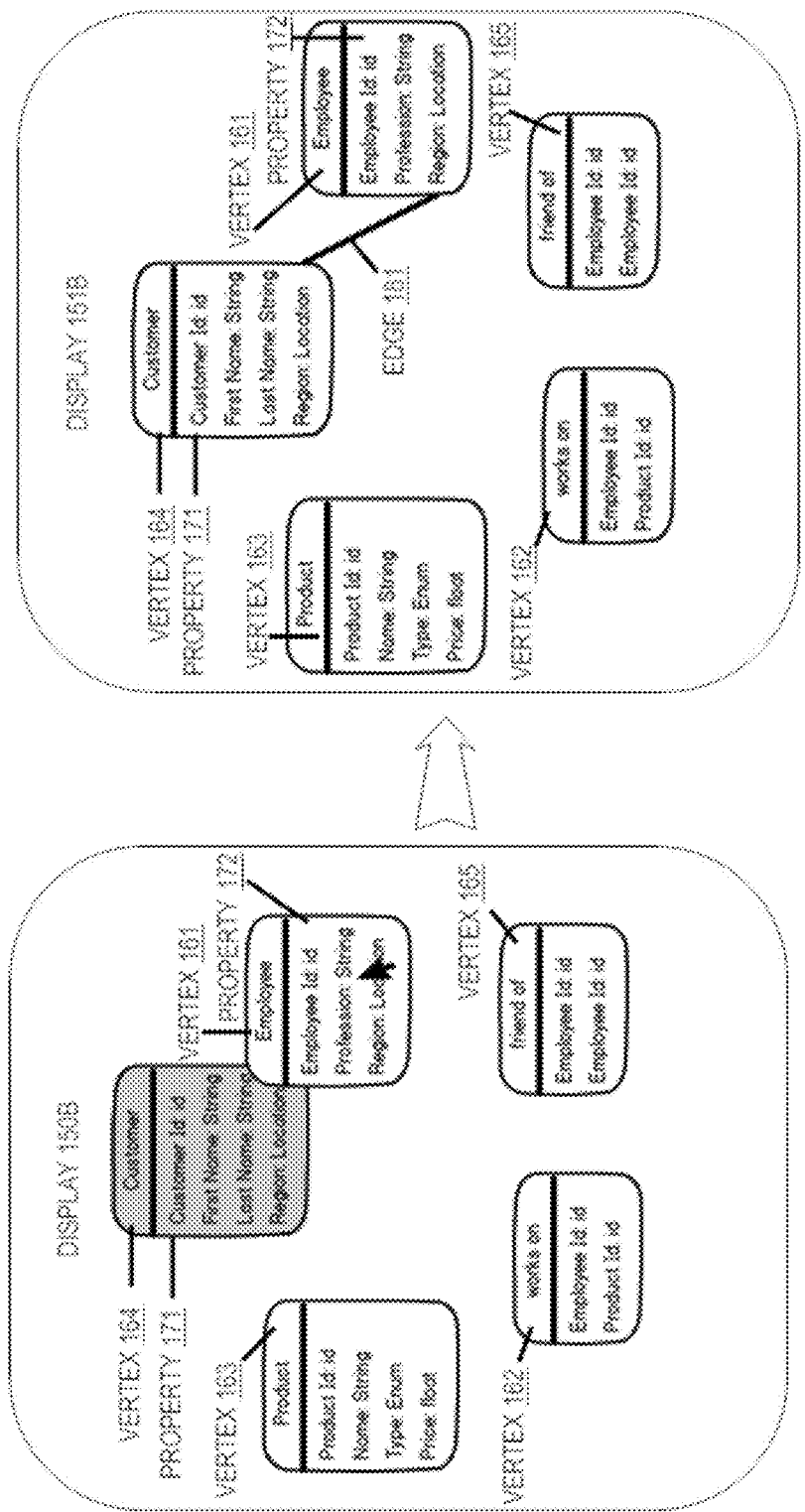

STATISTICAL WIDGETS 400

PIE CHART 403

CALENDAR 405

LINE CHART 402

MAP 406

HISTOGRAM 401

LIST BOX 404

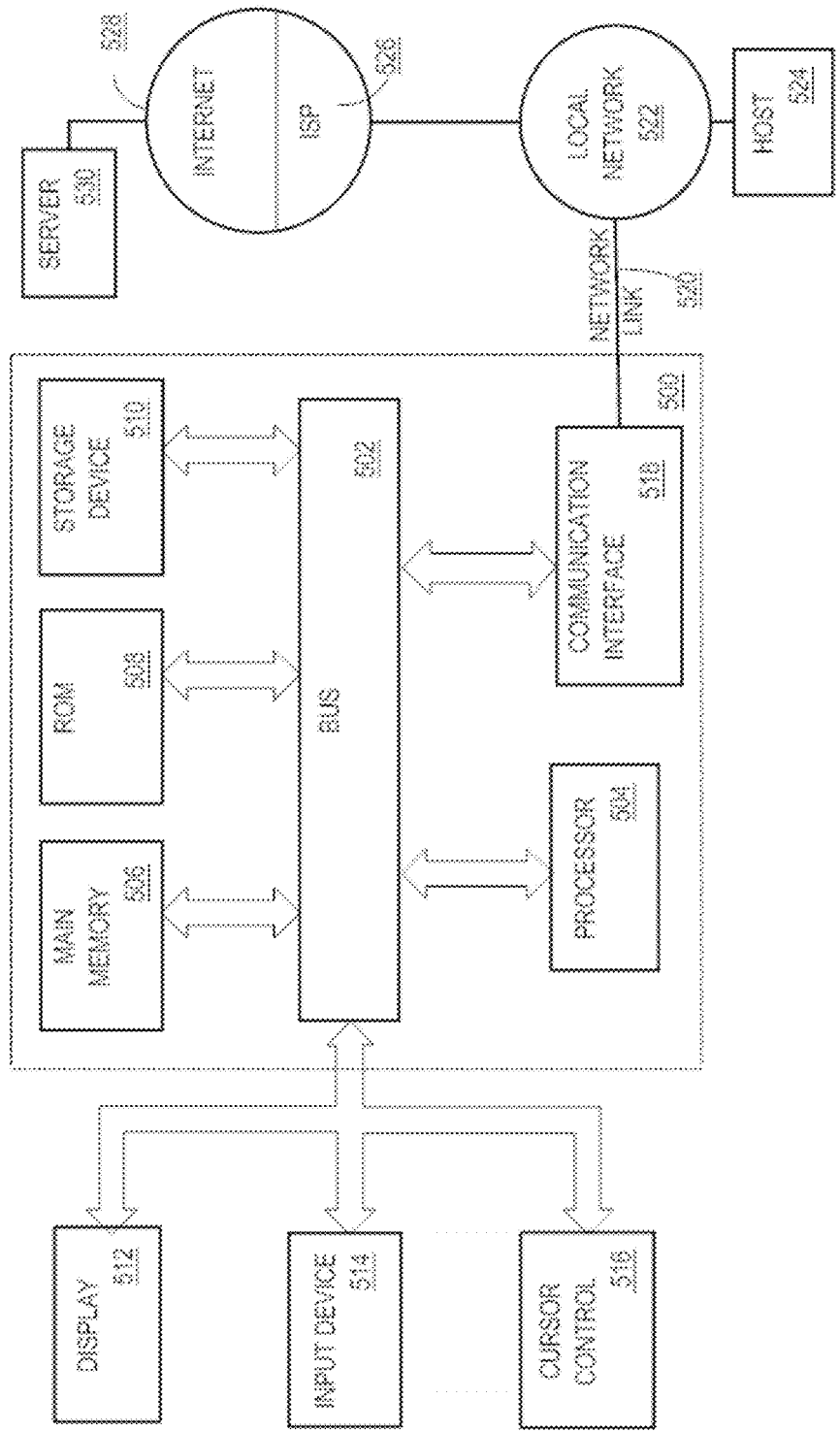

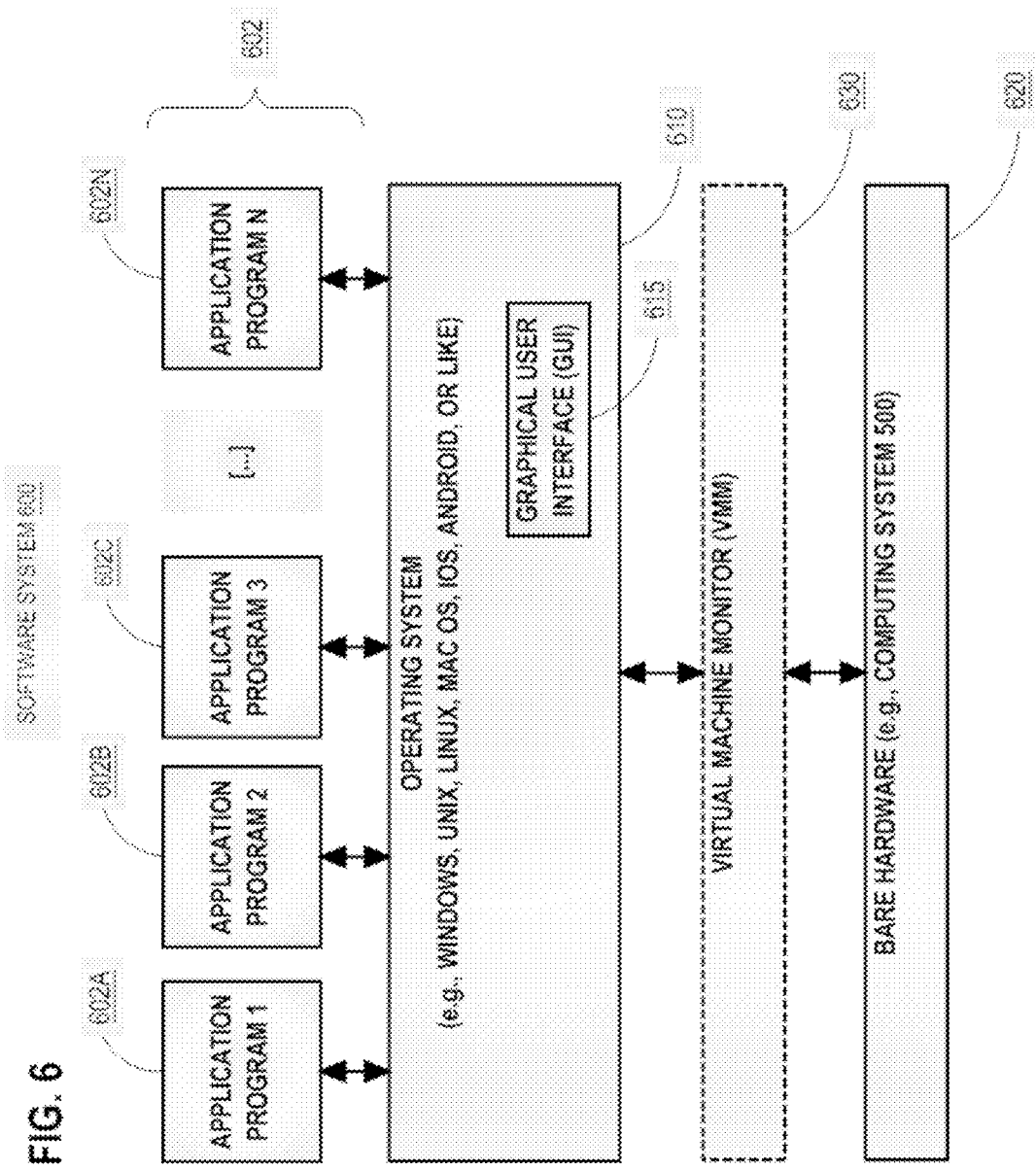

VISUAL GRAPH CONSTRUCTION FROM RELATIONAL DATA

BENEFIT CLAIM

This application claims the benefit of Provisional Application 62/421,837 (Title: A Graph Visualization Tool With Summary Visualization For Very Large Labeled Graphs; Inventors: Julia Kindelsberger, Daniel Langerenken, Korbinian Schmid, Sungpack Hong, Hassan Chafi), filed on Nov. 14, 2016, the entire contents of which is hereby incorporated by reference as if fully set forth herein.

FIELD OF THE DISCLOSURE

This disclosure relates to visual graph constructing. Presented herein are techniques that allow users to visually generate and summarize a property graph in a way that facilitates interactive exploration.

BACKGROUND

A graph is a convenient and effective tool for visualizing relationship between data entities. By representing data entities as vertices and their fine-grained interconnections as edges, graph visualization provides users a quick and intuitive understanding of the data set.

Graphs can be constructed from existing data sources using a graph query language. These data sources may be data tables. Such data tables may contain relational data stored in a CSV format. For example, Listing 1 shows an example of a script written in a graph query language referred Cypher. The script may be used to load two CSV files (customers.csv and orders.csv) and creating two vertices (CUSTOMER and ORDERS) to represent the two CSV files, respectively. Listing 2 shows an example of creating an edge (SOLD) connecting the two vertices.

Listing 1: CSV upload

```
// Create 'CUSTOMER' vertices
USING PERIODIC COMMIT
LOAD CSV WITH HEADERS FROM "file:customers.csv" AS row
CREATE (Customer {companyName: row.CompanyName, customerID:
row.CustomerID, fax: row.Fax, phone: row.Phone});
// Create 'ORDERS' vertices
USING PERIODIC COMMIT
LOAD CSV WITH HEADERS FROM "file:orders.csv" AS row
MERGE (order:Order {orderID: row.OrderID}) ON CREATE SET order.shipName =
row.ShipName;
```

Listing 2: CSV upload

```
// Create 'SOLD' edge
USING PERIODIC COMMIT
LOAD CSV WITH HEADERS FROM "file:orders.csv" AS row
MATCH (order:Order {orderID: row.OrderID})
MATCH (employee Employee {employeeID: row.EmployeeID})
MERGE (employee)-[:SOLD]→(order);
```

As shown above, graph construction from existing data sources can involve a user manually coding a script in a graph query language. However, performing manual coding and analysis can be tedious and time consuming.

It is against this background that a need arose to develop the embodiments described herein that facilitate the construction of graphs from existing data entities.

BRIEF DESCRIPTION OF THE DRAWINGS

In the drawings:

FIG. 1B is a diagram that depicts an example of visually generating an edge between two vertices based on a foreign key relationship, in an embodiment.

FIG. 5 is a block diagram that illustrates a computer system upon which an embodiment of the invention may be implemented.

FIG. 6 is block diagram that illustrates a software system upon which an embodiment of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

| | | |
|---|---|---|
| 1.0 | General Overview | |
| 2.0 | Property Graphs | |
| | 2.1 | Generating Vertices And Edges |
| | 2.2 | Generating Edges Based On Junction Tables |
| | 2.3 | Generating Self-directed Edges Based On Junction Tables |

| | |
|---|---|
| 3.0 | Property Graph Visual Construction Process |
| 4.0 | Statistical Summary, Interactive Selection and Filtration |
| 5.0 | Statistical Widgets |
| 6.0 | Hardware Overview |
| 7.0 | Software Overview |
| 8.0 | Cloud-Computing |

1.0 General Overview

Techniques are provided for enabling users to visually construct graphs from tables. Embodiments enable users to construct graphs by visually proposing pertinent connections based on data attributes (e.g., data types, foreign keys, and naming conventions). Visual graph construction helps users to construct graphs more quickly, in many cases, without any coding. Embodiments of this disclosure can make use of API/rule/SQL based approaches as a back-end. Accordingly, API calls or SQL statements can be generated from GUI actions.

Embodiments described herein are based on property graph data models. Property graphs contain vertices interconnected by edges. Vertices and edges may contain a number of properties and values (property-value pairs). Vertices and edges are tagged with labels, representing different roles or categories, based on the raw tables from which vertices or edges are generated.

In an embodiment, an interconnection represented as an edge is visually constructed by dragging and releasing of vertices onto each other, where the interconnection between multiple vertices are constructed based on foreign keys. In one embodiment, an edge can be a self-directed edge that is directed to a single vertex.

During a raw data table loading process or display of a property graph, a computer may generate a statistical summary with statistics of properties of a selected data table, a selected vertex or edge. Provided herein are various statistical widgets that meaningfully present the property statistics.

Responsive to an interactive selection of a particular vertex or edge of the graph, computer filters raw data and displays a summary of the raw data based on records of the selected tables.

2.0 Property Graphs

Figure 1A:
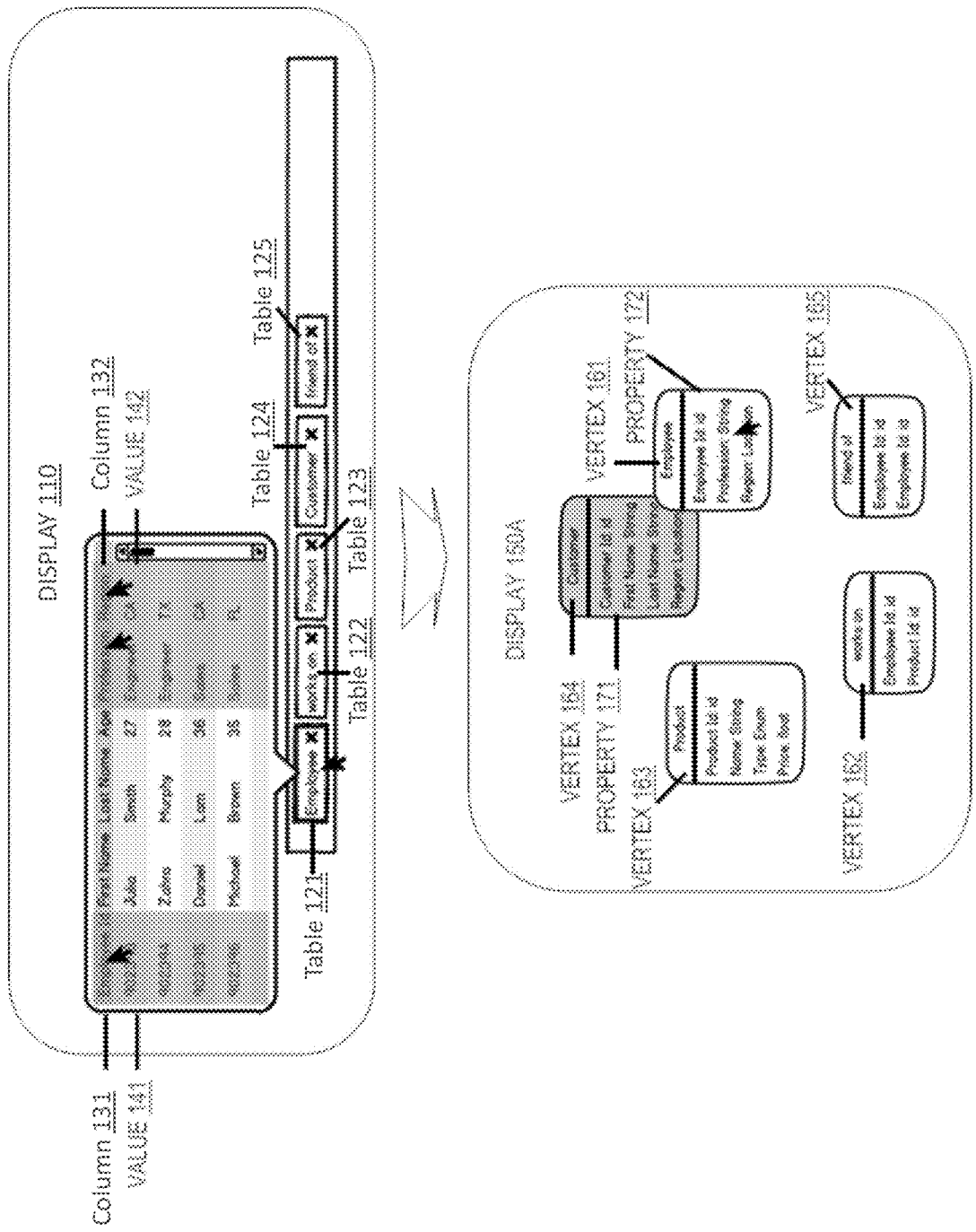
FIG. 1A is a diagram that depicts a graphic user interface (GUI) used to generate vertices or edges that is based on an interactive selection and filtration of data tables, in an embodiment.

FIG. 1A is a diagram that depicts an example of a GUI for visually constructing a property graph comprising vertices and/or edges based on an interactive selection and/or filtration of data tables (hereinafter "tables"). The black arrow may be a mouse cursor or a finger touch.

The GUI can be created by a computer system (i.e., computer 100) where the computer system may be a rack server such as a blade, a personal computer, a mainframe, a network appliance, a virtual machine, a smartphone, or other computing device. In embodiments, computer 100 accesses tables that are stored in memory, on disk, or over a network.

2.1 Generating Vertices and Edges

Display 150A shows that vertices are visually constructed based on a selection of tables, such as tables 121-125. As the term is used herein, a table stores relational data. Relational data is logically organized into rows and columns. Data contained in any spreadsheet (e.g., Excel spreadsheet) or spreadsheet-like structures are also referred to herein as relational data. Further, data stored in relational tables managed by a relational database management system (RDBMS) are relational data. Relational data may be stored in CSV files, where ordered column values are separated by a delimiter and rows are separated by another delimiter. Thus, a table may be a spreadsheet, and relational tables are a collection of tables.

A table may be represented and be the source of a set of vertices or a set of edges. A column of a table corresponds to a property of the set of vertices or the set of edges. A column value for the column corresponds to the property value. A row in the data table may correspond to a vertex or an edge.

Tables can be selected from a database or multiple data sources. Each table can be established as a vertex or an edge, and displayed as such within the GUI. For example, a user may enter environmental details into the GUI to declare sources of tables 121-125.

For example, a user may enter a file system path that identifies an employee spreadsheet file (not shown) to load Employee table 121. Likewise, the user may enter an open database connectivity (ODBC) uniform resource locator (URL) connection string that identifies product RDBMS (not shown) to load Product table 123. In addition, the user may specify a socket port number that identifies a data stream (not shown) of data from which to load a particular table, such as works-on table 122.

With each data source that the user enters, the user may also declare which kind of original vertex or edge type to load. For example, the user may declare that works-on table 122 can provide an edge for interconnecting vertices that are derived from other tables 121 and 123. The user may instruct the GUI to automatically create two vertices (i.e., Employee and Product) interconnected by a works-on edge. In addition, the user may declare that works-on table 122 should be loaded from an identified data stream. The GUI may use these entered environmental details to connect to data sources, such as streams, to discover schema details that describe the format of the Employee records, the Product records, and the works-on records, and their constraints, such as foreign key constraints between tables.

By automatic discovery, such as schema inspection or schema inference from sample records, or by manual entry, the GUI obtains enough schema metadata to automatically create a graph populated with vertices interconnected by edges.

Each table has properties and property values. For example, Employee table 121 has columns such as column 131 (i.e., Employee Id) and column 132 (i.e., Region). Column 131 may have numeric values 141 in the range of 902393 to 902396. Whereas, column 132 may have location values 142, such as CA, TX, FL. Vertices and/or edges are created based on selected tables, incorporating the names, columns and corresponding column values from the original tables.

Each vertex is displayed with a name and property-value pairs. In embodiments, vertex names correspond to table names, vertex properties correspond to table columns, and property values correspond to column values. For example, vertex 161 may be named as Employee, based on the name of table 121. Employee vertex 161 has properties 172, such as Employee Id, Profession, and Region. Each property is followed by a short description that identifies the data type of the specific property. For example, property Employee Id is followed by a short description (i.e., id) that indicates the data type of property Employee Id is a primary key value. Property Region is followed by a short description (i.e., Location) that indicates the data type of property Region is locational data.

Some vertices share similar vertex properties. For example, Customer vertex 164 may have a vertex property named "Region." Employee vertex 161 may also have a vertex property named "Region." The similar vertex properties can be used as foreign keys to generate interconnections between different vertices, which will be discussed in details below in Sections 2 and 3. On the other hand, some vertices need not all contain similar properties. For example, Customer vertex 164 may have a vertex property named "Customer Id." Whereas, Employee vertex 161 need not have such a named vertex property. Thus, vertices 161-165 may each have a different amount of vertex properties.

Some tables contain information on how other vertices represented by other tables are connected. These types of tables are junction tables. Junction tables can be constructed as edges or junction vertices. For example, works-on vertex 162 is created based on junction table 122. Vertex 162 is a junction vertex because it contains information that connects Employee Id and Product Id, representing a works-on relationship between an employee and a product. Friend-of vertex 165 is another junction vertex created based on junction table 125. Friend-of vertex 165 is a junction vertex because it contains information representing a friend relationship between a first employee and a second employee. Junction vertices may be further converted into edges interconnecting other vertices. More details about junction tables and junction vertices will be discussed below in Sections 2.2-2.3.

Referring to FIG. 1B, five vertices 161-165 are created based on five tables 121-125, respectively. As illustrated in Display 150B, all five vertices 161-165 are disconnected from each other after the initial table loading process. In Display 150B, no edges are constructed automatically by the computer 100. However, edges between vertices can be automatically constructed by a GUI based on schema metadata retrieved from data tables.

Alternatively, edges between vertices can also be manually constructed by dragging and releasing of vertices onto each other. Interconnections can be established based on rules or criteria that may refer to properties of vertices (e.g., a vertex property is a foreign key). A variety of rules or criteria can be applied by users to create interconnections represented as edges. For example, property labels (e.g. name, column name) can be a basis for matching criteria. An edge can be created between a first vertex and a second vertex when a first property label of the first vertex matches a second property label of the second vertex. Similarly, a property data type can be a basis for matching criteria. An edge can be created between a first vertex and a second vertex when a property data type of the first vertex matches a property data type of the second vertex.

For example, as illustrated in displays 150B-151B, Customer vertex 164 and Employee vertex 161 can be interconnected by dragging and releasing vertex 161 onto vertex 164. The interconnection (i.e., edge 181) between vertex 161 and vertex 164 is established based on a foreign key (e.g., matching property values—Region: Location) contained in both vertex 161 and vertex 164. Whereas, no edges will be generated if no foreign keys can be found in vertices 161 and 164. As discussed above, edge 181 may also be created automatically by the system when computer 100 detects that vertex 161 and vertex 164 share a matching foreign key (i.e., Region: Location).

An edge may connect a foreign key position in a first vertex to a corresponding foreign key position in a second vertex. For example, in display 151B, edge 181 has one end pointing to the position of property Region in vertex 161 and the other end pointing to the position of property Region in vertex 164, indicating matching property values (i.e., Region: Location) is the foreign key.

2.2 Generating Edges Based on Junction Tables

Junction tables contain information that shows relationships of vertices represented by other tables. Junction tables can be automatically depicted as edges connecting other vertices, or be constructed as junction vertices first and manually converted into edges.

In the case of automatic construction, a system may detect or suggest that a table is a junction table because it contains columns serving as foreign keys based on columns of other tables. For example, a current table may have two columns: a first column and a second column. If the first column serving as a first foreign key has a foreign key constraint with a column of a first table and a second column serving as a second foreign key has a foreign key constraint with a column of a second table, then the current table is designated as a junction table between the first table and the second table. The current table may be automatically depicted in the display as an edge interconnecting a first vertex and a second vertex by the system. The foreign key relationships may be determined from schema metadata retrieved from the selected tables.

Figure 1C:
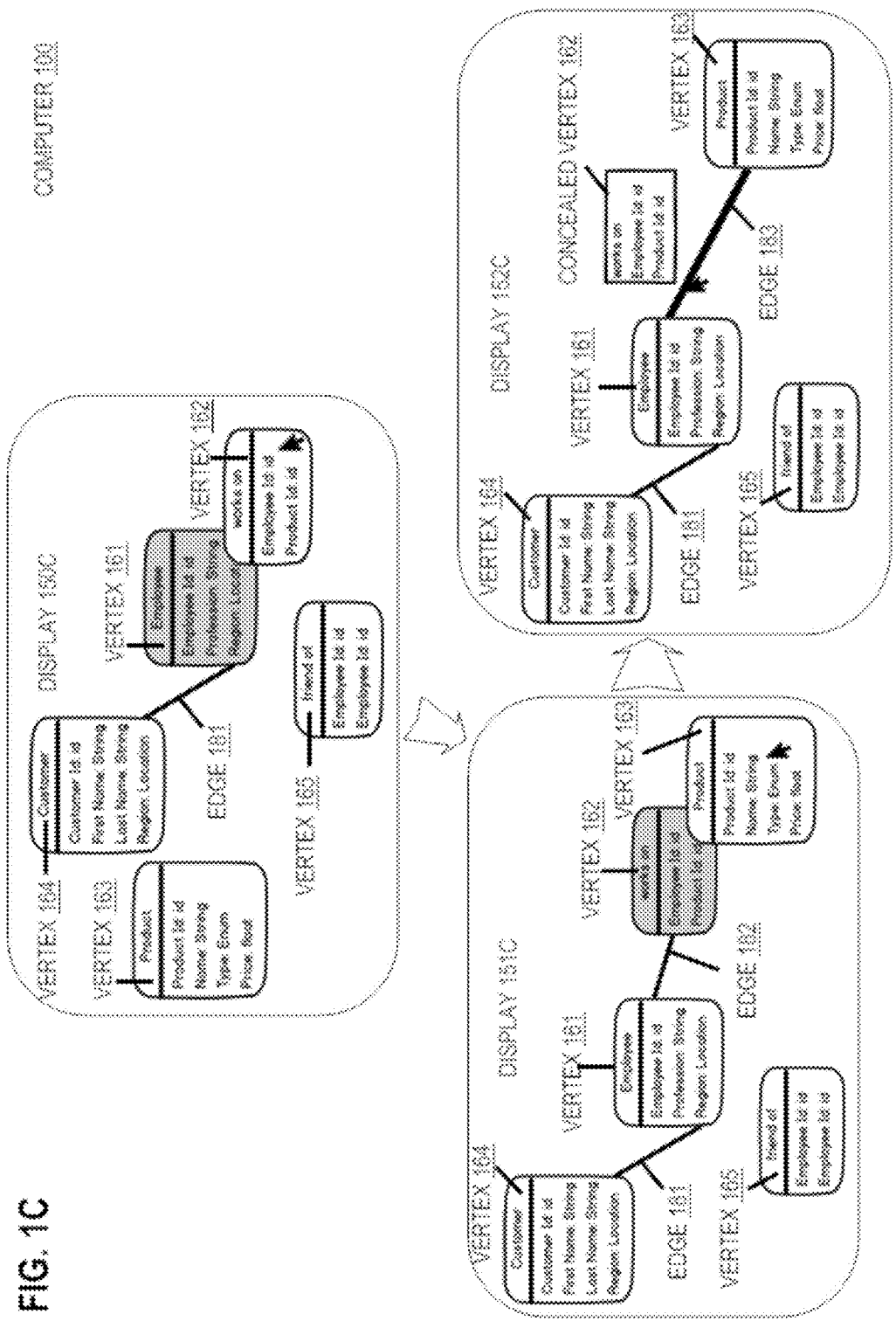
FIG. 1C is a diagram that depicts an example of visually generating an edge between two vertices based on a junction vertex or table, in an embodiment.

Alternatively, junction tables can be depicted as junction vertices first and manually converted into edges based on user instructions to establish foreign key relationships. For example, work on table 122 is a junction table because it contains information connecting Employee Id column 131 of table 121 and Product Id column of table 123. As illustrated in FIG. 1C, junction table 122 is initially depicted as vertex 162. Vertex 162 is a junction vertex because it contains information connecting property Employee Id of vertex 161 and property Product Id of vertex 163. Referring to Display 151C, as a first step, edge 182 is manually constructed between Employee vertex 161 and work on vertex 162 by dragging and releasing vertex 162 onto vertex 161. Referring to Display 152C, as a second step, vertex 161 and vertex 163 are interconnected via vertex 183 based on two foreign keys (i.e., Employee Id and Product Id). When Product vertex 163 is dragged and released onto junction vertex 162, vertex 162 collapses and is converted into a special edge 183 that interconnects vertex 161 and vertex 163. The special edge can be any type of edge that is different from other "regular" edges. For example, a special edge 183 can be thicker than other regular edges, as illustrated in Display 152C. Alternatively, a special edge can be represented as a dotted edge (not shown) or an edge with a different color (not shown).

The positions of the thicker edge 183 indicate that Employee vertex 161 is interconnected to Product vertex 163 by foreign keys, such as Employee Id and Product Id, via works-on vertex 162 which is a collapsed junction vertex.

The contents of the collapsed vertex 162 can be displayed in Display 152C when a user selects vertex 162. For example, a user mouse may hover over the thicker edge 183 to cause a tool tip to appear to reveal the contents of the vertex 162. The tool tip disappears as the user mouse moves away from the thicker edge 183.

On the other hand, junction table 122 can also be automatically depicted as special edge 183 interconnecting Employee vertex 161 and Product vertex 163 based on two foreign keys (i.e., Employee Id and Product Id). Computer 100 may determine foreign key relationships based on schema metadata collected from selected tables.

Similar to regular edges, a number of matching rules or criteria can be applied to create special edges, based on junction tables that interconnect other vertices. For example, special edges between a junction table and another table can be created when the junction table contains a foreign key constrained to a column of the other table.

2.3 Generating Self-Directed Edges Based on Junction Tables

Figure 1D:
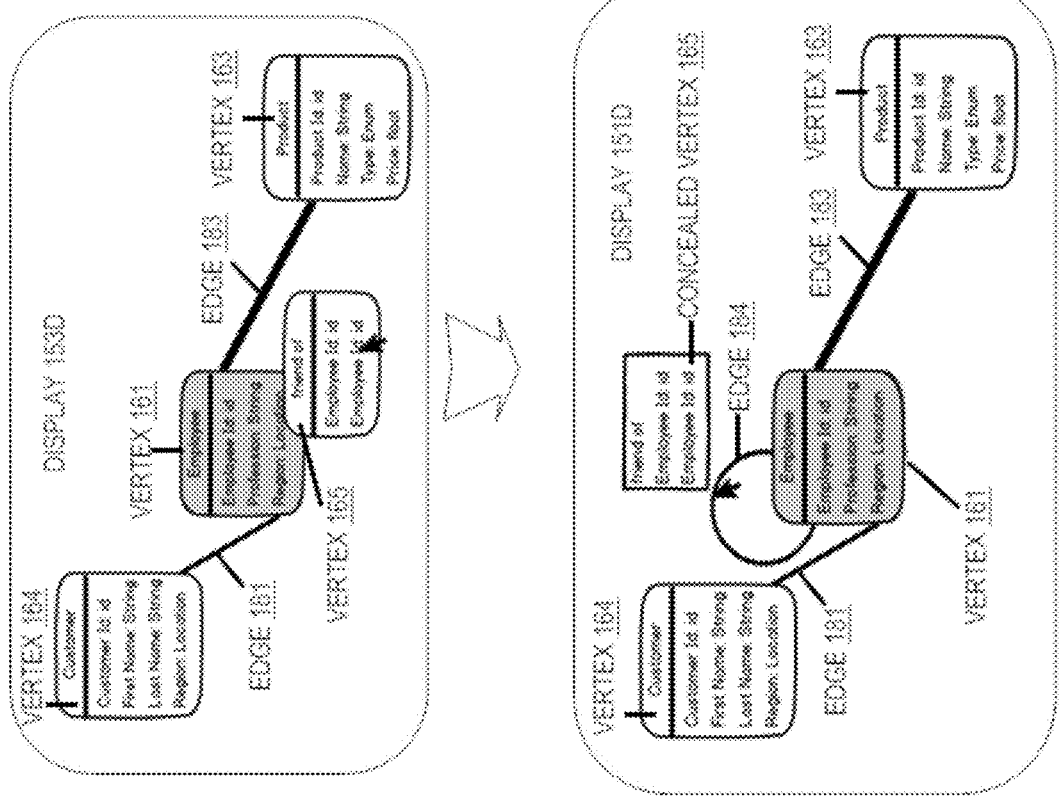
FIG. 1D is a diagram that depicts an example of visually generating a self-directed edge to a single vertex based on a junction vertex or table, in an embodiment.

Referring to FIG. 1D, property graphs may also contain reflexive (self-directed) edges. Self-directed edges indicate that foreign keys are contained in a single vertex. Junction tables can be constructed as self-directed edges either automatically or manually. In the case of automatic construction, computer 100 may determine foreign key relationships based on schema metadata collected from selected tables, and create a self-directed edge based on the junction table. In the case of manual construction, a junction table may be created as a junction vertex. The junction vertex can be converted into a self-directed edge based on user instructions to establish foreign key relationships.

As discussed above in Section 2.1, friend-of table 125 is represented by a junction table. Vertex 165 is a junction vertex created based on junction table 125. Vertex 165 contains information indicating friendship between a first employee and a second employee. Employee vertex 161 contains information of a number of employees. As illustrated in Displays 150D-151D, when a user drags and releases vertex 165 onto vertex 161, vertex 165 collapses and is converted into a self-directed edge 184 that indicates foreign keys (i.e., two Employee Ids) are contained in Employee vertex 161. Alternatively, junction table 125 can be automatically constructed as self-directed edge 184 if computer 100 determines that two Employee Id columns in table 125 can be used as two foreign keys for Employee table 121.

The contents of a collapsed vertex 165 can be displayed when a user selects the collapsed self-directed vertex. For example, a user mouse may hover over the self-directed edge 184 to cause a tool tip to appear to reveal the content of the vertex 165. The tool tip disappears as the user mouse moves away from the self-directed edge 184.

Similar to regular and special edges, the same matching rules or criteria can be applied to create self-directed edges, based on junction tables, that interconnect to a single vertex.

3.0 Property Graph Visual Construction Process

Figure 2:
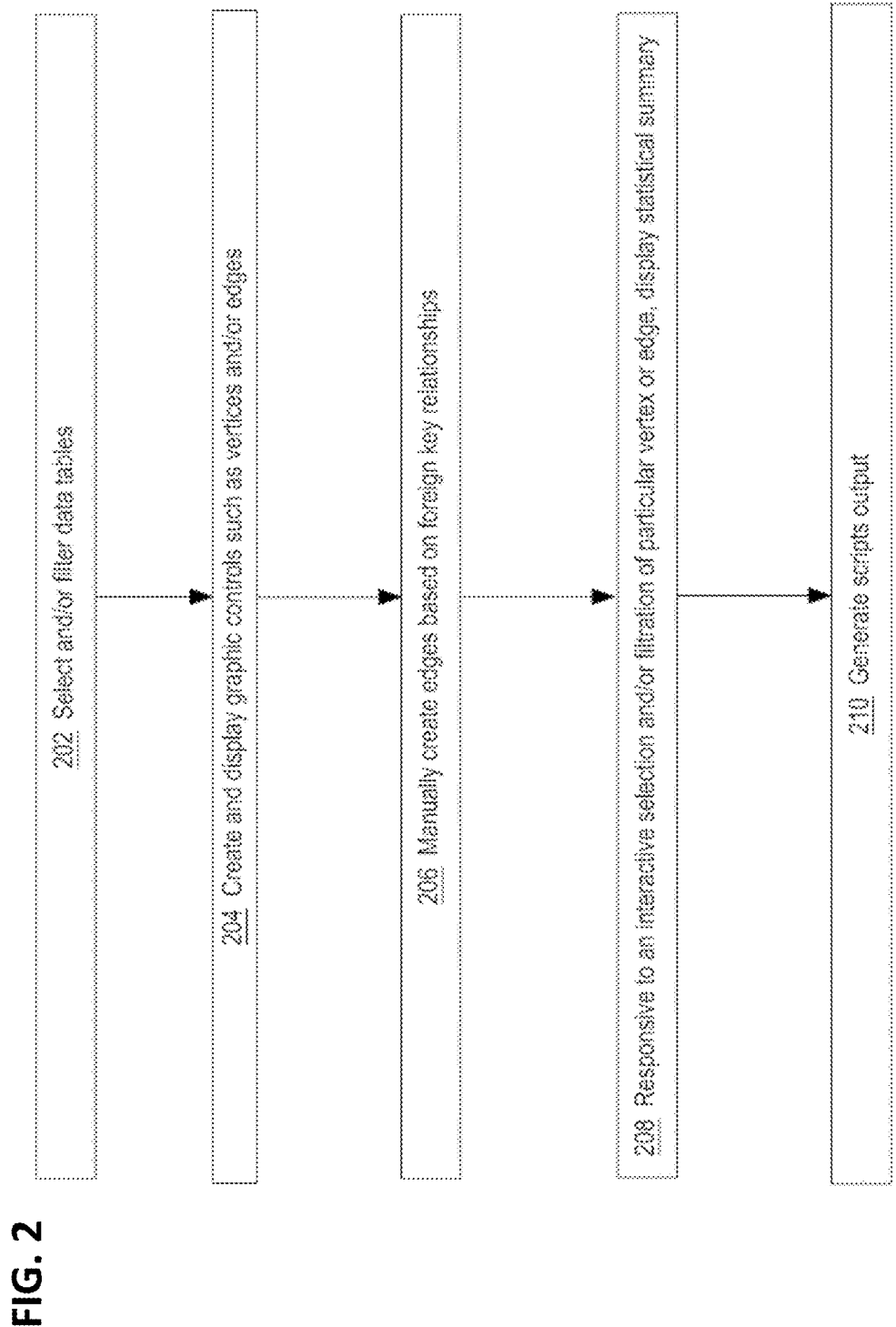
FIG. 2 is a flow diagram that depicts an example process that visually generates vertices or edges of a property graph that is based on an interactive selection and filtration of data tables, in an embodiment.

FIG. 2 is a flow diagram that depicts an example process that visually generates vertices or edges of a property graph that is based on a selection and filtration of data tables. FIG. 2 is discussed with reference to FIGS. 1A-1D.

Step 202 loads raw data tables from different sources to generate vertices and/or edges. As illustrated in FIG. 1A, Computer 100 loads five data tables 121-125 to create five vertices 161-165, respectively.

The raw data from data tables, such as 121-125, may contain thousands or millions of uninteresting (noisy) records. Extraneous records can distract users or slow analytics.

An optional filtration process can be applied in step 202. For example, within Employee table 121, a user might only be interested in data with Employee Ids between 902393 and 902396. Similarly, a user might only be interested in analyzing certain columns in a table. For example, a user may interactively select three columns from Employee table 121 (i.e., Employee Id, Profession, and Region) to reduce the total amount of data loaded for display and analysis. Other interactive filtration methods can also be applied in Step 202. More details about data filtration will be discussed below in Section 4.0.

When step 202 finishes, display 110 maybe loaded with tables 121-125 that were interactively selected or filtered. Step 204 generates graphic controls, such as vertices and/or edges, based on the selected or filtered tables. A graphic control can be a graphic display (e.g., vertices or edges) in a GUI that may be manipulated by a user, such as a drag and operation with a mouse cursor or a finger touch to provide user input. For example, a property graph is created and populated with vertices that each represents a table. For example, as illustrated in display 150A, vertices 161-165 are created based on tables 121-125, respectively. Vertices 162 and 165 are two junction vertices, created based on junction tables 122 and 125, respectively. In Display 150A, no edges are automatically created. On the other hand, edges may also be automatically created based on foreign key relationships in step 204.

In step 206, users may manually create edges by establishing foreign key relationships. A user may manually create edges by dragging and releasing vertices onto each other. The edges are created based on at least one foreign key. For example, as illustrated in FIG. 1B, edge 181 is created by dragging and releasing Employee vertex 161 onto Customer vertex 164, and the edge 181 is created based on a foreign key (i.e., Region: Location). Whereas, no edges will be created if no foreign keys can be matched in vertices 161 and 164.

In step 206, junction vertices can be converted into edges interconnecting other vertices. For example, as illustrated in FIG. 1C, junction vertex 162 contains relationship information between Employee Id and Product Id. The junction vertex 162 may be converted into a thicker edge 183 interconnecting Employee Id of Employee vertex 161 and Product Id of Product vertex 163. In step 206, junction vertices may also be converted into self-directed edges. For example, as illustrated in FIG. 1D, junction vertex 165 represents a friend relationship between one employee to another employee. Junction vertex 165 can be converted into a self-directed edge 184 connecting one employee of vertex 162 to another employee of vertex 162. As discussed above, junction tables can be automatically constructed as edges so that the manual construction step 206 can be optional.

A property graph can further be transformed into a summary graph especially when the property graph contains a very large number of vertices and edges.

Step 208 responds to an interactive selection of a particular vertex or edge by displaying a statistical summary. For example, a user may click on vertex 161 to cause statistical summary 390 to appear filled with property statistics about vertex 161. More details about statistical summary will be discussed below in Section 4.0.

Finally, an optional Step 210 generates scripts from which graphs can be modeled and generated from a table containing relational data. The scripts comply with a graph query language, such as Cypher or Gremlin. The scripts are generated from the input received through GUI according to the graphical graph model depicted therein.

4.0 Statistical Summary, Interactive Selection and Filtration

Property graphs with interconnected vertices may still not provide enough information to a user. For example, in Employee vertex 161, employee age information may not be shown in a property graph comprised of vertices and edges. Thus, computer 100 provides statistical summary 390 to reveal more (not necessarily all) details of a property graph.

In embodiments, statistical summary 390 is a GUI element such as a window, a popup, a balloon, a tool tip, or a modal or modeless dialog. Statistical summary 390 textually and/or graphically displays statistics that computer 100 derives from an interactively selected vertices or edges.

In embodiments, the selected subset should have exactly one vertex or one edge converted from a junction vertex. In embodiments, interactive selection involves multi-selection that occurs by a gesture such as lasso selection of multiple vertices or a mouse click or finger touch on each of multiple edges. In embodiments, a button press after interactive selection causes computer 100 to display statistical summary 390 based on the selected vertices or edges.

Figure 3:
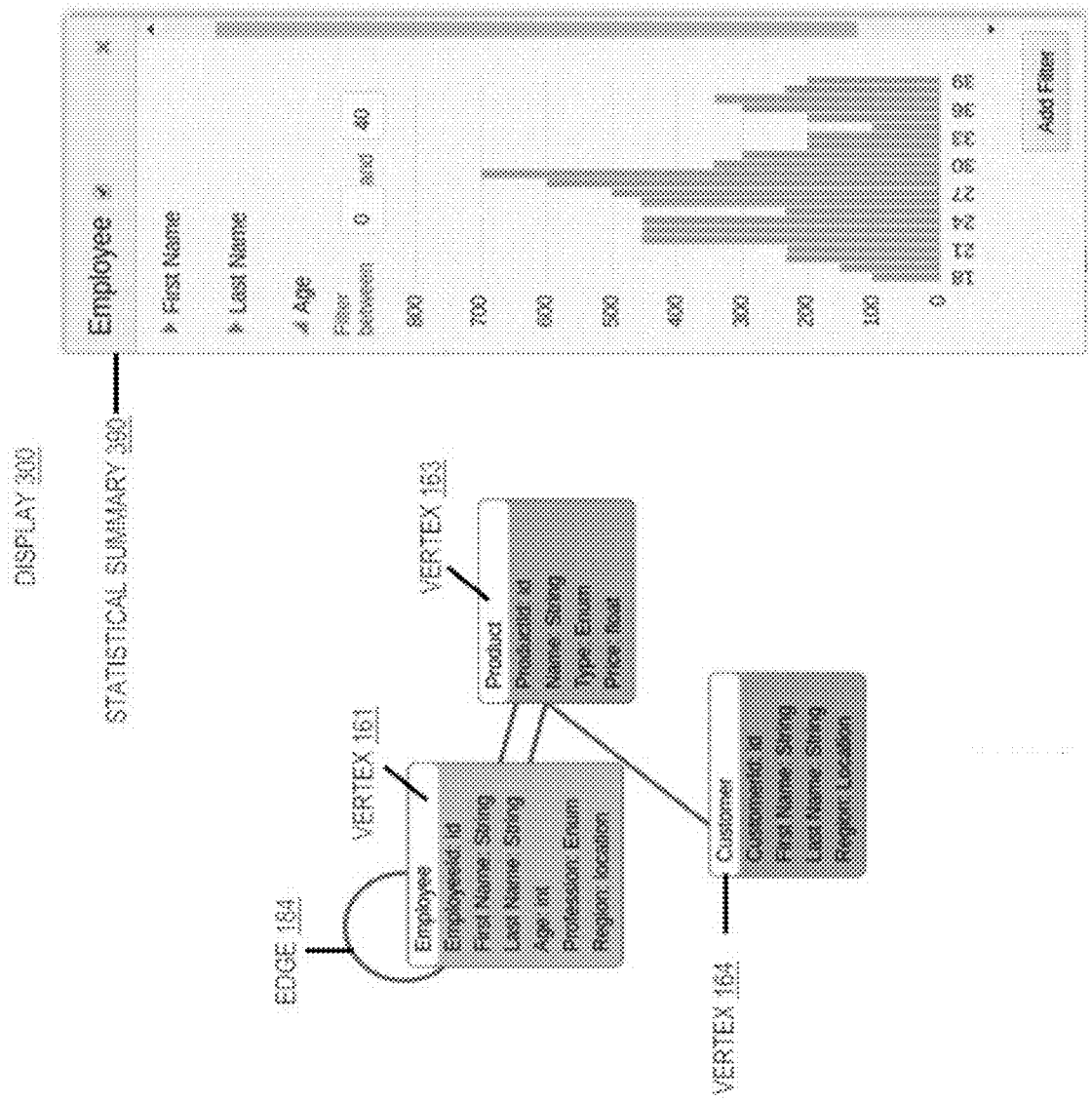
FIG. 3 is a screen snapshot that depicts an example display that shows a graph suitable for interactive data exploration and filtration, in an embodiment.

FIG. 3 is a screen snapshot that depicts example display 300 that shows a GUI suitable for interactive data exploration and optional data filtration.

On the left side of display 300 is a property graph with vertices interconnected by edges and a self-directed edge. A user may explore detailed data contained in specific vertices or edges by selecting the vertices or edges in the property graph. On the right side of display 300 is a statistical summary 390.

For example, as illustrated in FIG. 3, when Employee vertex 161 is interactively selected by a user, statistical summary 390 may display detailed information contained in vertex 161, such as the vertex name, a list of properties, and corresponding property values. In the case of vertex 161, statistical summary 390 displays the vertex 161 name (i.e., Employee) and properties, such as First Name, Last Name, and Age, and records contained within the respective properties.

In embodiments, selection of vertices may change even though statistical summary 390 already shows statistics for a previous selection. For example, a user may initially click on Employee vertex 161 and cause statistical summary 390 to appear filled with statistics of Employee vertex 161, and then subsequently click on Customer vertex 164. In embodiments, computer 100 dynamically repaints or otherwise visually updates statistical summary 390 to reflect such changes to the selected vertices or edges.

As shown in statistical summary 390, each property name appears with a triangle beside it. If the triangle points rightwards, that property is collapsed, and the statistics of the property are hidden. For example, statistic summary 390 shows the First Name property and the Last Name property are collapsed. If the triangle points downwards, that property is expanded, and statistics of the property are shown. For example, statistic summary 390 shows the Age property is expanded.

The quantity statistic may be shown as a histogram that summarizes reoccurring actual values. Values of a selected property can be further interactively manipulated or filtered. For example, statistic summary 390 shows a histogram representing an age distribution of employees. The employee age distribution is displayed by a three-year gap, such as 18-21, 21-24, 24-27, 27-30, 30-33, 33-36, and 36-40.

A vertical bar of the histogram is drawn black if it satisfies the filter, and drawn white if it does not satisfy the filter (not shown). For example as shown in FIG. 3, a user sets an age filter with the lower age bound of 0 and an upper age bound of 40. All the vertical bars of the age histogram are drawn black because all employees have an age between 18 and 39. On the other hand, a user could interactively replace (reenter) the lower age bound of 18 with a new value of 24. Accordingly, employee records with ages between 18 and 24 will be filtered out and are hidden in statistic summary 390, and such interactive filtration adjustment may automatically cause histogram vertical bars with an age range 18-24 to draw white.

A user may click the Add Filter button at the bottom of statistic summary 390 to apply certain filtration criteria that eliminate a subset of data from the selected vertices or edges. For example, a user may enter an age range between 30 and 33, and click the Add Filter button to eliminate employee records with an age younger than 30 or older than 33. Similar filtration may also be applied at the stage of loading raw data tables discussed above in Sections 2.0-3.0.

A statistic summary may have a scroll bar when a list of properties is too long. A scroll bar is a long thin section at the edge (e.g., on the right-hand side) of a statistic summary by which summary contents can be scrolled based on user input. A scroll bar may help users to navigate through property list and analyze content more efficiently.

5.0 Statistical Widgets

Figure 4:
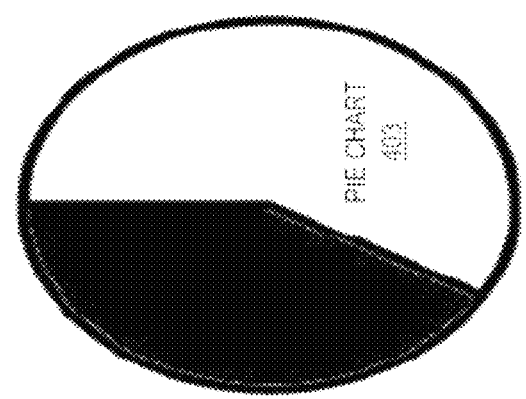
FIG. 4 is a diagram that depicts example statistical widgets that present statistics in meaningful ways, in an embodiment.
Figure 4:
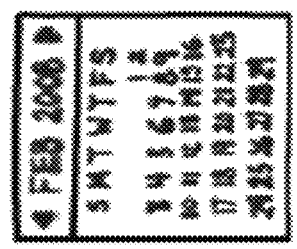
Figure 4:
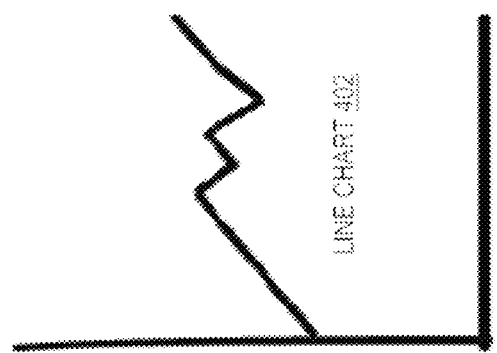
Figure 4:
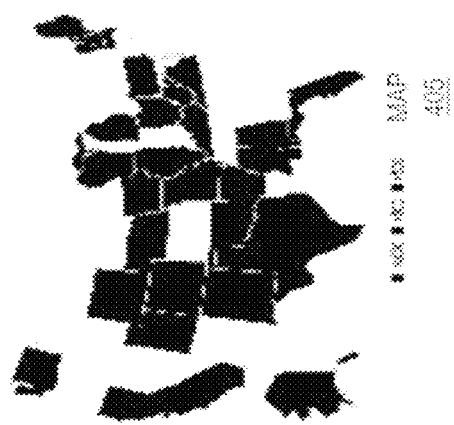
Figure 4:
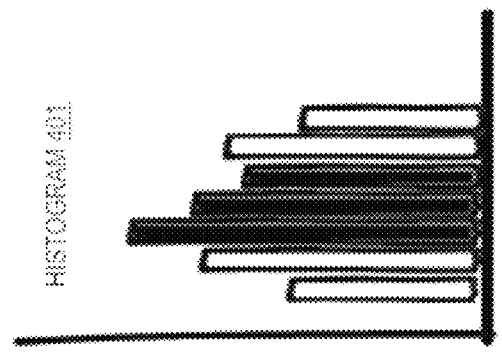
Figure 4:
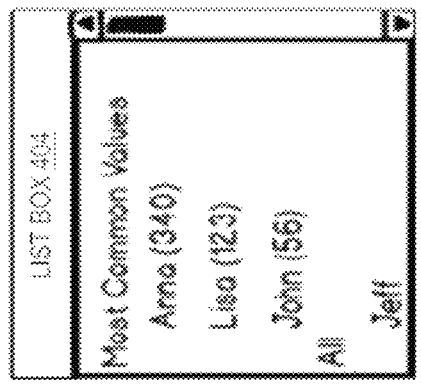

How a particular statistic is displayed within a statistical summary depends on the nature of the statistic, the nature of the property domain, and the distribution of the property values. FIG. 4 is a diagram that depicts example statistical widgets 400 that present statistics in meaningful ways.

Simple statistics having only one or two values may be displayed as text. For example, a mean or the extremes of a range (minimum and maximum) can be shown as a number or pair of numbers.

Other statistics may benefit from dedicated visualization, either because of the nature of the property domain or the amount of statistical values involved. For example, histogram 401 is a bar chart that may show cars sold by manufacturers. For example, distinct values may be shown on the horizontal axis, and frequency counts may increase upwards along the vertical axis.

As shown, some vertical bars of histogram 401 are black to indicate satisfaction of a filter. Whereas, other vertical bars are white to indicate suppression by the filter. For example, foreign auto makers may be suppressed (filtered out).

Line chart 402 may show time series data, with time as the horizontal axis. Pie chart 403 may provide an alternate rendition of a histogram. Calendar 406 may instead be used to show temporal data.

Pie chart 403 emphasizes relative fractions of a whole, such as market share of a whole market. Whereas a bar chart emphasizes absolute quantities, such as counts.

List box 404 may enumerate actual values that occur for a property. As shown, most frequent values can be shown at the top with population counts. Distinct values are shown below the frequent values. The list may scroll, such as with a scroll bar.

A statistic may be decomposed by geographic regions, such as map 405. For example, a histogram whose bins are geographic regions may be rendered as map 405.

An aspect that is common to many of widgets 401-406 is the grouping of multiple data points. For example, multiple data points are represented by each wedge of pie chart 403, each bar of histogram 401, and each geographic state of map 405. Hovering, clicking, or other interaction with a visual detail, such as a pie wedge, may cause a tool tip that reveals details such as a count. Likewise, such interactions may facilitate entry of a filter.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Software Overview

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

8.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method, comprising:
   receiving user input, from a user, indicating a selection of:
     a) a plurality of tables comprising a plurality of columns, and b) a subset of said plurality of columns to load for a property graph;
   generating statistics based on content values stored in a particular table of said plurality of tables while loading content of said subset of said plurality of columns without loading content of other columns of said plurality of columns;
   for the particular table of said plurality of tables, displaying a respective graphic control representing said particular table, wherein the respective graphic control displays said statistics of said particular table as a bar chart, a geographic map, a pie chart, and/or a line chart;
   receiving user input indicating that a first table and a second table each have a respective foreign key relationship with a third table;
   based on receiving user input that the first table and the second table each have the respective foreign key relationship with the third table, converting a third graphic control representing the third table into an edge graphic control representing the third table;
   displaying the edge graphic control as a connection between a first graphic control representing the first table as a first vertex and a second graphic control representing the second table as a second vertex.

2. The method of claim 1, further including:
   making a first determination that a first attribute of the third table has a first foreign key relationship with a first attribute of the first table; and
   making a second determination that a second attribute of the third table has a second foreign key relationship with a first attribute of the second table;
   wherein converting the third graphic control representing the third table into the edge graphic control is performed in response making the first determination and the second determination.

3. The method of claim 2, wherein said displaying the edge graphic control comprises displaying the edge graphic control as a connection connecting the first attribute of the first table to the first attribute of the second table.

4. The method of claim 2, wherein making the first determination includes determining that the first attribute of the first table and the first attribute of the third table satisfy one or more matching criteria.

5. The method of claim 4, wherein the one or more matching criteria includes that the first attribute of the first table and the first attribute of the third table have same data type.

6. The method of claim 1, wherein receiving user input indicating that the first table and the second table each may have the respective foreign key relationship with the third table includes detecting that the first graphic control was dragged and released over the second graphic control.

7. The method of claim 1, further comprising: during displaying the respective graphic control, receiving, from the user, a criterion to filter a plurality of data items from said particular table.

8. The method of claim 1, further comprising: after converting the third graphic control representing the third table into the edge graphic control representing the third table, receiving, from the user, a criterion to filter a plurality of data items from said particular table.

9. The method of claim 1, wherein the said edge graphic control is a self-connected edge and wherein the first table is the second table.

10. The method of claim 1, further comprising displaying the third graphic control representing the third table when the user hovers over the edge graphic control being displayed as the connection.

11. The method of claim 1, wherein displaying the respective graphic control representing said particular table includes displaying said particular table as a list.

12. One or more non-transitory computer-readable storage media storing sequences of instructions which, when executed by one or more computing devices, cause:
   receiving user input, from a user, indicating a selection of:
     a) a plurality of tables comprising a plurality of columns, and b) a subset of said plurality of columns to load for a property graph;
   generating statistics based on content values stored in a particular table of said plurality of tables while loading content of said subset of said plurality of columns without loading content of other columns of said plurality of columns;
   for the particular table of said plurality of tables, displaying a respective graphic control representing said particular table, wherein the respective graphic control displays said statistics of said particular table as a bar chart, a geographic map, a pie chart, and/or a line chart;
   receiving user input indicating that a first table and a second table each have a respective foreign key relationship with a third table;
   based on receiving user input that the first table and the second table each have the respective foreign key relationship with the third table, converting a third graphic control representing the third table into an edge graphic control representing the third table;
   displaying the edge graphic control as a connection between a first graphic control representing the first table as a first vertex and a second graphic control representing the second table as a second vertex.

13. The one or more non-transitory computer-readable storage media of claim 12, wherein the sequences of instructions include instructions that, when executed by said one or more computer devices, cause:
making a first determination that a first attribute of the third table has a first foreign key relationship with a first attribute of the first table; and
making a second determination that a second attribute of the third table has a second foreign key relationship with a first attribute of the second table;
wherein converting the third graphic control representing the third table into the edge graphic control is performed in response making the first determination and the second determination.

14. The one or more non-transitory computer-readable storage media of claim 13, wherein said displaying the edge graphic control comprises displaying the edge graphic control as a connection connecting the first attribute of the first table to the first attribute of the second table.

15. The one or more non-transitory computer-readable storage media of claim 13, wherein making the first determination includes determining that the first attribute of the first table and the first attribute of the third table satisfy one or more matching criteria.

16. The one or more non-transitory computer-readable storage media of claim 15, wherein the one or more matching criteria includes that the first attribute of the first table and the first attribute of the third table have same data type.

17. The one or more non-transitory computer-readable storage media of claim 12, wherein receiving user input indicating that the first table and the second table each may have the respective foreign key relationship with the third table includes detecting that the first graphic control was dragged and released over the second graphic control.

18. The one or more non-transitory computer-readable storage media of claim 12, wherein the sequences of instructions include instructions that, when executed by said one or more computer devices, cause: during displaying the respective graphic control, receiving, from the user, a criterion to filter a plurality of data items from said particular table.

19. The one or more non-transitory computer-readable storage media of claim 12, wherein the sequences of instructions include instructions that, when executed by said one or more computer devices, cause: after converting the third graphic control representing the third table into the edge graphic control representing the third table, receiving, from the user, a criterion to filter a plurality of data items from said particular table.

20. The one or more non-transitory computer-readable storage media of claim 12, wherein the said edge graphic control is a self-connected edge and wherein the first table is the second table.

21. The one or more non-transitory computer-readable storage media of claim 12, wherein the sequences of instructions further cause displaying the third graphic control representing the third table when the user hovers over the edge graphic control being displayed as the connection.

22. The one or more non-transitory computer-readable storage media of claim 12, wherein displaying the respective graphic control representing said particular table includes displaying said particular table as a list.

* * * * *